US005273796A

United States Patent [19]

Elbing et al.

[11] Patent Number: 5,273,796

[45] Date of Patent: Dec. 28, 1993

[54] PAPER TRANSLITES

[75] Inventors: Steven R. Elbing, Winnebago County; Richard J. Luce, Waukesha County; Scott G. Thoe, Winnebago County, all of Wis.

[73] Assignee: Service Litho-Print, Inc., Oshkosh, Wis.

[21] Appl. No.: 12,569

[22] Filed: Feb. 2, 1993

Related U.S. Application Data

[63] Continuation-in-part of Ser. No. 817,786, Jan. 8, 1992, abandoned.

[51] Int. Cl.⁵ .......... B32B 9/00

[52] U.S. Cl. .......... 428/23; 428/195; 428/203; 428/204; 428/206; 428/537.5; 428/913; 40/615; 283/74; 283/75

[58] Field of Search .......... 428/203, 204, 206, 220, 428/537.5, 29; 40/615; 283/74, 75

[56] References Cited

U.S. PATENT DOCUMENTS

| | | | |
|---|---|---|---|
| 454,560 | 6/1891 | McNevin | 428/29 |
| 856,519 | 6/1907 | Deeks | 428/29 |
| 2,096,180 | 10/1937 | Kroner | 428/203 |
| 3,462,338 | 8/1963 | Stein | 428/203 |
| 3,664,449 | 7/1887 | Benjamin | 428/29 |
| 4,666,757 | 6/1987 | Helinski | 428/913 |
| 4,869,941 | 9/1989 | Ohki | 428/40 |

*Primary Examiner*—Patrick J. Ryan
*Assistant Examiner*—A. Bahta
*Attorney, Agent, or Firm*—R. Jonathan Peters

[57] ABSTRACT

This invention relates to paper translites comprising a translucent paper sheet or web bearing on the front facing thereof an image area of a right reading in one or more colors, and on the back facing thereof an image area but of a reverse image and of the same colors. Each of the image areas is printed by halftone dots, and the image area of the reverse image has substantially dot-for-dot registration with the image area of the right reading. The printing plate used for printing the image area for the reverse image has about the same or a lower percentage of halftone dots than the printing plate used for printing the image area for the right reading, thereby resulting in a lighter value for each color of the reverse image relative to the same color of the right reading. The resulting translite is equally pleasing viewed by reflective light only and viewed by transmitted light.

14 Claims, 1 Drawing Sheet

PAPER TRANSLITES

This invention is a continuation-in-part of application Ser. No. 07/817,786, filed on Jan. 8, 1992, now abandoned.

FIELD OF THE INVENTION

This invention relates to translites comprising translucent paper printed on front and back and viewable from the front with reflective light or with transmitted light.

BACKGROUND OF THE INVENTION AND PRIOR ART

Displays, posters, signs, display cards, placards, and the like, are used extensively for advertising purposes. Displays of this type bear a picture, characters, figures, letters, or a combination thereof, printed on a paper sheet or web. These displays typically are large, and frequently are exhibited as reflective art from a wall hanging or window hanging, and as such are to be viewed from the front side only, that is, by reflected light. When a display of this type is illuminated from behind but viewed from the front, that is, viewed by transmitted light, such as in the case of a window hanging, the colors of the printed subject matter or image area appear washed out or faded, or less intense or less vivid, relative to the same display viewed by reflective light only.

Displays have been used in combination with a light box. In such an arrangement, the display is set for viewing by positioning or suspending the display in the frame of a light box, which comprises a closed box with an open front where the display is suspended, and a light source is disposed to the rear of the display for viewing by transmitted light. More recently, displays for a light box have been printed on plastic, which have been commercially successful but nonetheless have several drawbacks or objectionable features, as discussed hereinbelow in greater detail. The display sheet, whether of paper, plastic, or a combination thereof, is sufficiently opaque so that the image area is visible in daylight when viewed by reflected light, but yet thin enough, or of sufficient translucency, to be viewed by transmitted light. Thus, when the display is illuminated by the light transmitted from behind, it is intended that the print area or image area be sufficiently clear to the viewer from the front side, but that the purpose of the transmitted light is to enhance the colors, thereby rendering the image area aesthetically pleasing to the viewer. However, paper displays for viewing from a light box with transmitted light appear washed out or faded, as stated above in the case of a window hanging, and therefore have achieved very little or no commercial success. Plastic displays for this purpose are aesthetically pleasing when viewed with transmitted light, but if viewed by reflective light only, the print area appears dark or dull and there is a loss of detail, as discussed below.

The prior art shows advertising posters adapted for alternative viewing by reflected light and by transmitted light. In U.S. Pat. No. 1,487,705 discloses a first picture visible by reflected light, and a second identical picture on transparent photographic film placed coincident with the first, thereby enhancing the contrast when viewing the picture by transmitted light. A composite of two pictures, not identical, and registering as to all parts, is shown in U.S. Pat. No. Re. 15,454. A certain representation of the picture is visible when viewed by reflected light from the front, and a combined representation is visible when viewed by transmitted light.

A composite sign or display card for viewing from both sides is disclosed in U.S. Pat. No. 1,781,283. According to this patent, the poster or sign is partly opaque, and advertising data is printed on both sides, but each side is visible from one side only. Another portion of the poster is of a translucent material, and the printing is visible from both sides. Printing on the translucent portion can be a double print, that is, the printed matter is duplicated on the opposite side of the sheet in reversed form and registering with the print on the outer face. The sign was expressly designed as a window sign, which means that the lights source is variable and nonspecific, and because the sign is not matched in its entirety, the sign is for viewing from both sides. Similar prints for window shades for viewing from both sides is taught in U.S. Pat. No. 366,449, wherein it states that the prior art teaches providing opposite faces of a window shade with the same designs in register.

A vivid color contrast is achieved by the invention disclosed in U.S. Pat. No. 4,716,672, wherein a laminate is formed comprising a transparent sheet, the visible image, and aluminum foil In U.S. Pat. No. 4,666,757, the image is printed to the underside of a transparent sheet, and affixed to a coextensive, opaque backing sheet, thereby providing a bright and vivid color print protected from smudges or abrasion. In U.S. Pat. No. 2,096,180, two individual pictures are printed on opposite sides of a sheet, and an opaque layer is interposed between the two images, whereby one image is visible from one side and the other from the opposite side.

Plastic posters for viewing from the front with transmitted light from behind are currently in extensive use. The image area on the plastic sheet or substrate is produced in halftone to create an illusion of shading or tonal value, as described hereinbelow in greater detail. The plastic poster bears a right reading or image on the front side, and in some instances is also printed on the back side with a reverse image. When viewed with transmitted light, a highly visible sign is seen by the viewer, and if there is printing of a reverse image on the back side, the colors are intensified, thereby rendering a more aesthetic or pleasing picture. A poster of this type is known in the art as "translite," and as used herein and in the appended claims, the term "translite" is intended to include a sufficiently translucent substrate (e.g., sheet) on which a photographic image has been reproduced onto the substrate by printing means for display and lit from behind to permit a clear front view. Plastic sheets composed of polystyrene and polycarbonate have been commonly employed for printed translites. Also, it should be understood that such terms as display, poster, sign, bill, graphic board, display card, placard, and similar terms, are used synonymously and interchangeably, and such use is intended to mean that type of sheet or web bearing printed matter or image.

Plastic substrates or sheets such as used for translites have numerous disadvantages or objectionable features. Chief among these disadvantages is costs. Plastic materials are relatively expensive. Further, the plastic materials such as polystyrenes tend to be brittle, and therefore must be provided as a sufficiently thin sheet to be flexible, yet be thick enough to have sufficient strength. Printing on a plastic surface requires special handling and special inks, thereby substantially increasing the costs, and such inks or the components thereof have the potential of causing health and/or environmental problems. It also is highly significant that, although plastic translites intensify the colors used for the image area, this effect is limited to transmitted light only, because of the inherent qualities of the plastic and because of the required thickness of the substrate. Thus, when a plastic translite is viewed by reflective light only, the print area appears dark or dim, manifesting a loss of brilliance and detail, and therefore is not aesthetically pleasing.

This invention has therefore as its purpose to provide a new and useful paper translite that is aesthetically pleasing when viewed by reflective light and by transmitted light, thereby overcoming the disadvantages of the prior art, and further providing such a backlit display that is environmentally beneficial in that a portion or all is substantially biodegradable.

SUMMARY OF THE INVENTION

In accordance with the present invention, there is provided a translite comprising a translucent paper web. The term "web" as used herein and in the appended claims is intended to include sheet, substrate, and the like. The front facing of the paper web is provided with an image area of a right reading in one or more colors, and the back facing thereof bears the same image area but in reverse imaging and of the same colors. Each of the two image areas, whether of a picture, letters, characters, etc., is printed by halftone dots (described below), and have substantially dot-for-dot registration. The image area for the front facing, i.e., right reading, is provided as high quality reflective art. The image area for the back facing is printed with a reverse image, and in a preferred embodiment, with a skeletal reverse image. The term "skeletal" or "skeleton" as used herein means a reduced reproduction of the halftone, especially of the middle tones and highlights, described below in greater detail. Thus, the reverse image is printed with substantially the same, or preferably with a lower percentage of halftone dots than the image area for the front facing, i.e., right reading. Where desired, the reverse image may be printed with ink having a lower value in density than the ink used for printing the front image. If the reverse image is printed with a lower percentage of halftone dots than that used for the right reading, or with an ink having a lower value in density than the ink used for the right reading, or a combination of both, the result is a lighter value for each color of the reverse image relative to the same color used for the right reading. The resulting translite made in accordance with the invention is equally pleasing viewed by reflective light only and viewed by transmitted light, and further is characterized by an enhancement in one or more color attributes when illuminated from the back facing and viewed from the front facing.

DETAILED DESCRIPTION OF THE INVENTION

Figure 1:
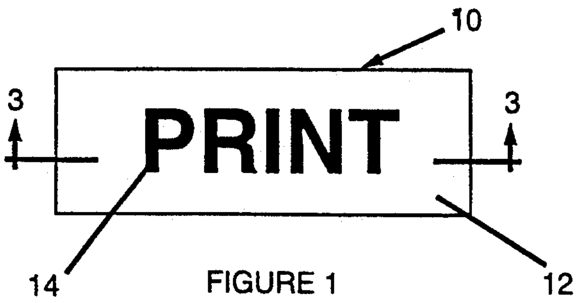
FIG. 1 is a plan view of a translite made in accordance with the present invention showing a right reading as viewed from the front side.

In the printing arts such as offset lithography, letterpress, gravure, and silk screen, the image area is produced in halftones which rely on dots to create an illusion of tones. Halftone is a special type of photography used in printing, and by this technique the halftone negative is transferred to the surface of the printing plate as tiny dots, each of which carry ink from the plate, directly or indirectly, to the paper. A gradation of tone is reproduced by this pattern or combination of small and large dots. The dots forming the halftone copy are too small to be seen with the naked eye, and because the dots vary in size, there is created the illusion of shading or continuous-tone image. If the dots are small and widely spaced, the image area on the paper will appear to be light; but large and closely spaced dots create a dark image area. That is, for an image area reproduced in halftones, the lightest parts, called highlights, contain very small dots, and the darkest areas, called shadows, contain large size dots. The shades between these two are called middle tones. Halftone, therefore, can produce tone values ranging from near white to near black. The tonal range is expressed in percent dots, and dot percentage is measured by the size of the dots. In a dot size comparator, 5% dots constitute a highlight area, that is, 95% of the copy is near white and 5% is covered with black dots; and in the shadow areas, 95% of the copy is near black and 5% carries white space. This technique of halftone photography is well known in the graphic arts industry, and although the present invention utilizes halftone reproduction, it should be understood that halftone photography, per se, is not part of this invention.

The invention is described hereinbelow with particular reference to printing the translite by offset lithography, but it should be understood that other printing processes which can utilize the halftone technique is also applicable.

The translite of the present invention utilizes a paper stock having sufficient translucency to achieve an image enhancement from transmitted light cast from its backside. The translucency of paper typically is measured in opacity, typically calculated on a Bausch and Lomb Opacimeter. The opacity to weight ratio represents the degree of show-through of printed matter on the reverse side of the paper being measured, and the value therefore varies depending on the basis weight of the paper. We have found that for most offset lithography, paper suitable for translites made in accordance with the present invention has an opacity value less than about 95, and preferably less than about 88. Additionally, paper most suitable for the translite exhibits high whiteness, most commonly specified in terms of a requirement for brightness, a standard measurement in the paper industry and determined under standardized conditions by the reflectance from the paper of a certain wave length of blue light. For purposes of this invention and in particular for offset lithography, we have found that paper suitable for translites of the present invention has a brightness of not less than about 60, and preferably not less than about 80. Desirably, the paper sheet exhibits relatively low opacity and high brightness. Aside from balancing these requirements, conventional printing papers may be used, and in actual practice the grades or characteristics of the paper can be determined best by the printer, and is determined primarily by the printing process, and the type of ink used in the process. Thus, papers are provided in basis weight, bulk, and with or without different finishes, sizings and coatings. Coated paper having a glossy finish and designed for offset lithography is particularly useful because this paper has a smooth finish which enhances the colors, has a greater affinity for ink, excellent ink holdout, and produces excellent halftone prints with sharp definition.

Any suitable inks can be used for printing the front reading and the reverse image, and the choice of ink depends on such factors as type and grade of paper, printing process, the desired colors, and the density value. In conventional halftone printing by lithography, 4-color process printing is used for reproducing full color photographs, and we have found that fade-resistant, oil base inks are particularly suitable. In the 4-color process, the four standard colors used are cyan, magenta, yellow, and black. From these, the entire color spectrum can be achieved. To enhance the color spectrum, other solid colors can be used in conjunction with the 4-color process.

In the printing process, such as by offset lithography, a printing plate comprising halftone dots is prepared first for the right reading. The front facing of the paper substrate is then printed in a conventional manner, including the colors, using the appropriate paper and inks. Thereafter, the substrate is reversed, and the reverse image is printed on the back facing using a printing plate comprising halftone dots. It is essential for purposes of this invention that the reverse image have substantially dot-for-dot registration with the right reading. Also, the printing plate for the reverse image printed on the back facing should have substantially the same or, preferably, a lower percentage of halftone dots than the printing plate for the right reading for the front facing. If the image area reproduced in halftones is light, it then may be desirable to have the reverse image with about or near 100% of halftone dots for that used for the front facing. The darker the image area in halftones, the lower percentage of halftone dots is more desirable. The same ink for each halftone color may be used for both the front facing and the back facing, or where desired, the ink density of the ink used for the back facing may be of lower value than the ink density of the ink used for the front facing. If the reverse image is printed with a lower percentages of halftone dots or with an ink having a lower ink density, the tone is of lighter value for each color relative to the same color for the right reading. We have found that it is usually desirable for the percentage of halftone for the reverse image to range from about 10 to 90 percent, highlight to shadow, respectively, of that of the right reading, but this percent can vary depending largely on the ink color and the tonal value desired for the end product. As a result of one or both of these differences in halftone between the reverse image and right reading, each color for the reverse image has a lighter value relative to the same color for the right reading, thereby enhancing one or more color attributes when the translite is illuminated from the back and viewed from the front. The colors observed by the viewer of the translite appear especially vivid or brilliant, and true in color.

Where desired, the printed translite may be provided with a transparent overlay on one or both facings to protect the translite from smudges, abrasion, fading, heat, tearing, and the like. Suitable overlays include aqueous base coatings, petroleum base coatings, and plastic film. These coating compositions and films, although not part of the present invention, per se, are useful and beneficial in the combination of the invention, and are well known and commercially available in the printing and graphic arts. A coating may be applied to one or both printed surfaces of the paper sheet by any conventional means such as spraying, dipping, rolling, and the like. The applied coating typically is rendered active or cured by heating at an elevated temperature of about 200° to 500° F., by ultra violet (UV) light, or by infra red (IR) light. Suitable coating compositions include acrylic resin coatings supplied by Akzo Coatings Inc, Zion, Ill.; and acrylate base and bisphenol-A epoxy base coatings tradenamed Miracure from Pierce & Stevens Corp., Buffalo, N.Y. The resulting coating desirably has a thickness of from about 0.05 to 2 mils. Both types of coatings can be provided at relatively low costs, provide adequate protection without interfering with the translite effect, and noticably enhance one or more color attributes as observed by the viewer. The petroleum base coatings, and desirbly cured by UV light, provide a stronger protection than the aqueous coatings. Where desired, the overlay may comprise a suitable plastic film, such as polypropylene or polyester, having a thickness of from about 0.5 to 5 mils. The film may be applied to one or both surfaces of the paper sheet, and is of essentially the same dimensions as the translite sheet so as to be substantially coterminous therewith. The film may be applied to the printed substrate with an adhesive, or the film may have a built-in tacky surface, and the film typically is bonded to the paper surface by heat and pressure. Because the plastic film is clear or transparent, and the resulting laminate is relatively thin, there is substantially no interference with the translite effect and the color brilliance is enhanced. A plastic film overlay provides the best protection relative to a coating, especially against weather for outdoor usage.

Figure 2:
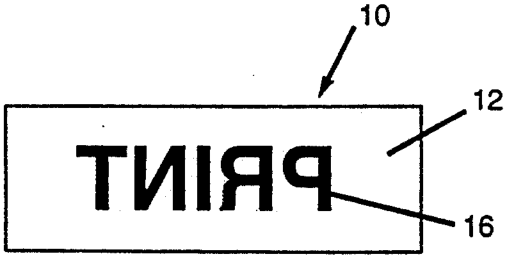
FIG. 2 is a plan view of the translite of FIG. 1 but showing the reverse image as viewed from the back side.
Figure 3:
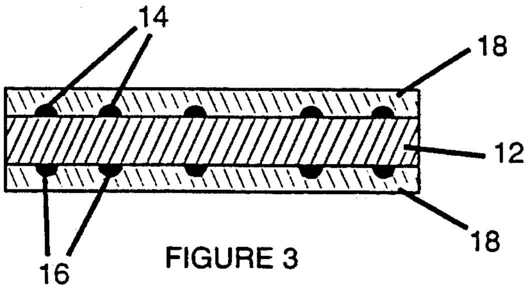
FIG. 3 is a sectional view of the translite of FIG. 1 taken on line 3—3 of FIG. 1, and having the dimensions exaggerated for purposes of clarity.

There is shown in the drawings a preferred embodiment of the invention, wherein like reference numerals refer to similar parts throughout the various views. In FIG. 1, the translite indicated generally by the numeral 10 is viewed from the front facing, and comprises a translucent paper sheet or web 12 bearing an image area 14 that is a right reading. FIG. 2 is a view from the back side of paper sheet 12 having an image area 16 that is a reverse image and having substantially dot-for-dot registration with the right reading. It is preferable to provide the printed sheet with a transparent overlay, and as shown in FIG. 3, an overlay 18, comprising a plastic film or coating, described above, is provided on each facing of the sheet.

Figure 4:
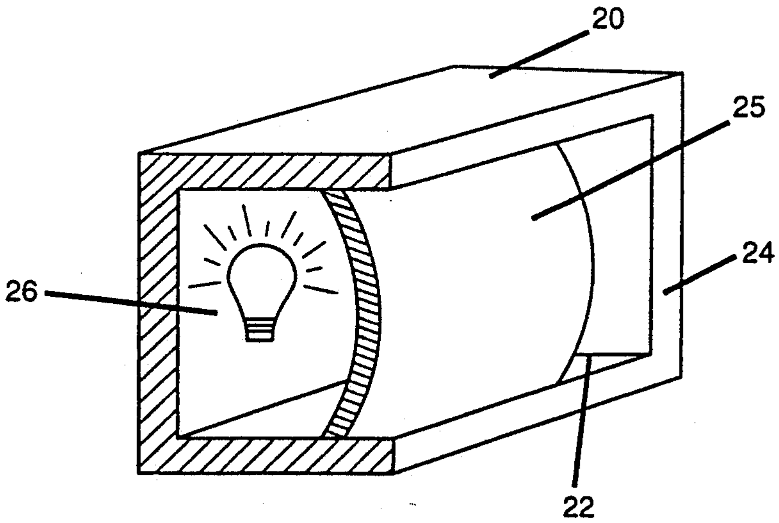
FIG. 4 is a perspective illustration, partly in cross-section and partly schematic, showing a translite of the present invention mounted in a light box.

The translite is desirably mounted or positioned in a light box, which provides a specific and controlled source of light for illuminating the translite from the rear or back facing. There is shown in FIG. 4 a light box 20 suitable for installation of the translite. The light box is enclosed by top, bottom, and three side walls, and is provided with open front 22 having a framing means 24 for holding the translite. Optionally, the light box may be provided with a glass or plastic plate 25 to diffuse or soften the light, and this plate may be concave-convex (as illustrated) or substantially flat. A suitable light source 26 is positioned within the box and behind the translite and plate 25 (if used). The resulting assembly forms an enclosed chamber, and the light illuminates the translite. A viewer will see the exposed or front facing only of the translite, and, most significantly, the display is as aesthetically pleasing when viewed by reflective light only as when viewed by transmitted light, which characteristic is not the same for a plastic translite.

It will be observed that by reason of the invention a paper translite is provided not having the weight and thickness disadvantages of plastic translites, and further is more economical than plastic translites. In addition, paper is known to be biodegradable, and therefore the paper translite is environmentally beneficial. Further, the paper translites of this invention can be printed by conventional printing methods, using conventional printing techniques, and the resulting structure, when viewed either by reflected light or by transmitted light, exhibits one or more enhanced color attributes.

Having described our invention, and certain embodiments thereof, we claim:

1. A translite comprising a translucent paper web bearing on the front facing thereof an image area of a right reading in one or more colors, and on the back facing thereof said image area but of a reverse image and of the same colors, said image area of said reverse image having substantially dot-for-dot registration with the image area of said right reading, each of said image areas made from printing plates bearing halftone dots, the printing plate used for printing the image area for the reverse image having the same or a lower percentage of halftone dots than the printing plate used for printing the image area for the right reading.

2. A translite according to claim 1 and further including a transparent overlay for at least one facing thereof.

3. A translite according to claim 2 wherein said overlay is a plastic film.

4. A translite according to claim 3 wherein said overlay is provided on both facings.

5. A translite according to claim 4 wherein said overlay is an aqueous coating.

6. A translite according to claim 5 wherein said overlay is provided on both facings.

7. A translite according to claim 2 wherein said overlay is a petroleum base coating.

8. A translite according to claim 7 wherein said overlay is provided on both facings.

9. A translite according to any one of claims 1–8 wherein said translite is mounted on a light box.

10. A translite according to any one of claims 1–8 wherein the percentage of halftone dots for the image area of the reverse image is about 10 to 90 percent, highlight to shadow, respectively, of the halftone dots for the image area of the right reading, thereby resulting in a lighter value for each color of the reverse image relative to the same color of the right reading.

11. A translite according to any one of claims 1–8 wherein the ink density for the ink used for the halftone dots for the image area of the reverse image is of lower value than the ink density for the ink used for the halftone dots for the image area of the right reading, thereby resulting in a lighter value for each color of the reverse image relative to the same color of the right reading.

12. A translite according to claims 10 wherein said translite is mounted on a light box.

13. A translite according to claim 11 wherein said translite is mounted on a light box.

14. A translite according to any one of claims 1–8, 12 or 13 wherein the percentage of halftone dots for the image area of the reverse image is about 10 to 90 percent, highlight to shadow, respectively, of the halftone dots for the image area of the right reading, and wherein the ink density for the ink used for the halftone dots for the image area of the reverse image is of lower value than the ink density for the ink used for the halftone dots for the image area of the right reading, thereby resulting in a lighter value for each color of the reverse image relative to the same color of the right reading.

* * * * *